(12) United States Patent
Braun et al.

(10) Patent No.: US 6,646,740 B2
(45) Date of Patent: Nov. 11, 2003

(54) OPTICAL MONOCHROMATORS HAVING TIME DISPERSION CORRECTION

(75) Inventors: David M. Braun, Santa Rosa, CA (US); Paul Emerson Bussard, Santa Rosa, CA (US); Roger L. Jungerman, Petaluma, CA (US); Benjamin S. Wheeler, Bodega Bay, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 132 days.

(21) Appl. No.: 09/957,696

(22) Filed: Sep. 19, 2001

(65) Prior Publication Data

US 2003/0053052 A1 Mar. 20, 2003

(51) Int. Cl.[7] .................................................. G01J 3/18
(52) U.S. Cl. ........................................ 356/334; 356/328
(58) Field of Search ................................ 356/328, 334, 356/333, 305, 326

(56) References Cited

U.S. PATENT DOCUMENTS

| | | | |
|---|---|---|---|
| 5,233,405 A | | 8/1993 | Wildnauer et al. |
| 5,796,479 A | * | 8/1998 | Derickson et al. .......... 356/326 |
| 5,886,785 A | * | 3/1999 | Lefevre et al. ............. 356/328 |
| 6,327,280 B1 | * | 12/2001 | Ducellier et al. ............. 372/20 |

* cited by examiner

Primary Examiner—Frank G. Font
Assistant Examiner—Layla Lauchman

(57) ABSTRACT

An optical filter for generating a filter output signal from a filter input signal, the filter output signal consisting of light from the filter input signal in a predetermined bandwidth. The filter includes a grating, a first optical assembly and an optical signal path. A portion of the input signal traverses the optical signal path such that it is diffracted from the grating to form a first intermediate beam that is input to the first optical assembly, which generates a second intermediate beam therefrom. The second intermediate beam is directed back to the grating and is diffracted by the grating, a portion of the diffracted second intermediate beam forming a portion of the filter output signal. The second intermediate beam is the inverted image of the first intermediate beam, and hence, the second reflection from the grating compensates for the time dispersion introduced by the first reflection from the grating.

15 Claims, 7 Drawing Sheets

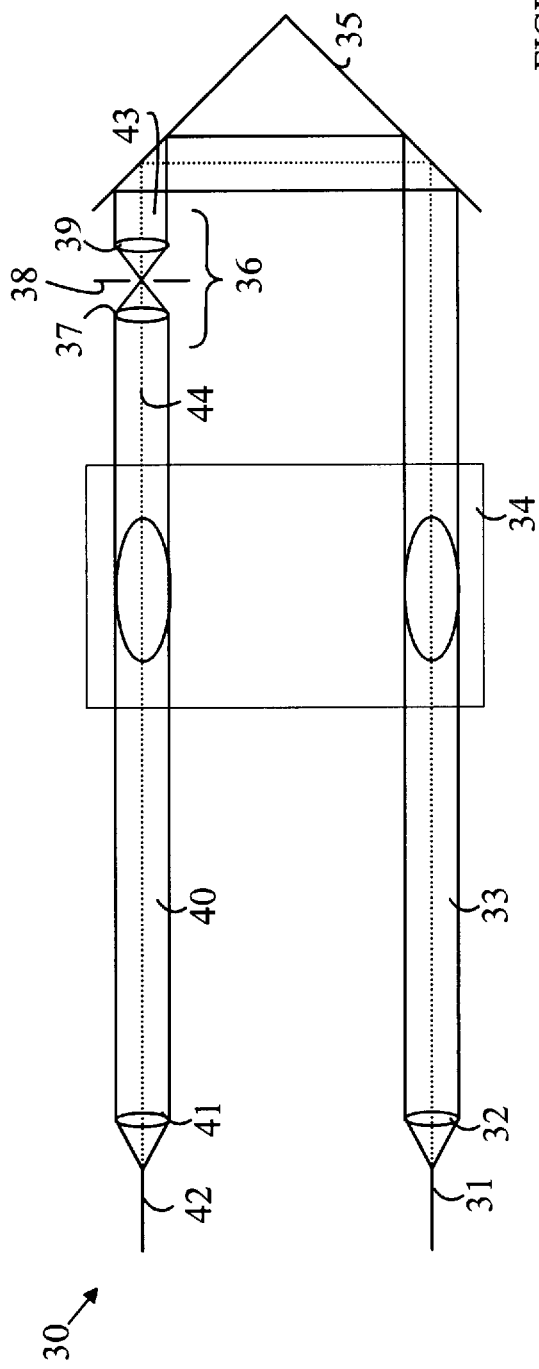
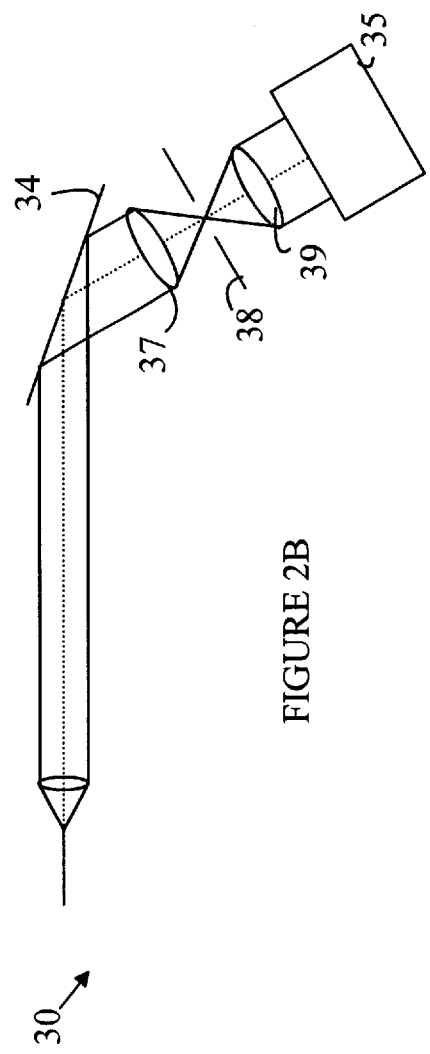
FIGURE 2A
FIGURE 2B

OPTICAL MONOCHROMATORS HAVING TIME DISPERSION CORRECTION

FIELD OF THE INVENTION

The present invention relates to optical monochromators, and more particularly, to monochromators used in applications where the timing information of the optical signals selected by the monochromator is important.

BACKGROUND OF THE INVENTION

Optically-based communications based on dense wavelength division multiplexed (DWDM) signaling are becoming increasingly common because such systems greatly increase the capacity of the optical fibers used for transmitting data and voice traffic. In such systems, multiple signals are sent on an optical fiber by modulating optical signals at slightly different wavelengths. Hence, a single optical fiber can provide tens or even hundreds of communication channels that are independent from one another.

Optical telecommunication systems must transmit data and voice traffic in a manner that meets a variety of transmission specifications including jitter, rise time, fall time, and overshoot, among others. Optical filters or demultiplexers are used to select one channel from the DWDM telecommunication system for analysis by subsequent electronic test equipment such as a digital communications analyzer or a bit error ratio tester. These optical filters must not add any time dispersion to the signal to be measured. Time dispersion acts to smooth out any optical transitions degrading the measured performance of the signal being tested.

A number of optical filter designs have been used for selecting a single channel. These include the use of Fabry-Perot interferometers, thin film interference filters, Michelson interferometers, Dragone routers, and diffraction gratings. Prior art grating based optical filters inherently introduce time dispersion because the grating in general is tilted with respect to the incident light. Thus one part of the incident light travels a further distance than other parts of the light, and the transmitted signal wavefront is dispersed in time. For example, if one side of the beam travels 30 mm further than the other side, then a 10 GHz modulated signal (whose wavelength is 30 mm) would have a full wave of dispersion spread across the beam.

The HP 71452B analyzer avoids this dispersion by reflecting the focused light back towards the collimating lens and grating in a new manner for a second pass. This arrangement is discussed in detail in U.S. Pat. No. 5,233,405 to Wildnauer. The reflection flips the two sides of the beam perpendicular to the axis of rotation of the grating such that the longer traversing beam traverses the shorter path on the second pass and vice versa. This second pass also condenses the wavelength dispersion providing no additional wavelength filtering by the grating. While this design eliminates time dispersion for a narrow optical resolution bandwidth it requires relatively large lenses between the grating and the reflector used to send the beam back to the grating along a different optical path. Suitable lenses significantly increase the cost of this system.

Broadly, it is the object of the present invention to provide an improved optical analyzer that corrects for time dispersion while not requiring the large lenses discussed above.

These and other objects of the present invention will become apparent to those skilled in the art from the following detailed description of the invention and the accompanying drawings.

SUMMARY OF THE INVENTION

The present invention is an optical filter for generating a filter output signal from a filter input signal, the filter output signal consisting of light from the filter input signal in a predetermined bandwidth at a center wavelength. The filter includes first and second dispersive elements and a first optical assembly. The filter provides a first signal path over which a portion of the filter input signal travels and is diffracted from the first dispersive element to form a first intermediate beam that is input to the first optical assembly. The first optical assembly generates a second intermediate beam that is directed to the second dispersive element and is diffracted by the second dispersive element. A portion of the diffracted second intermediate beam forms a portion of the filter output signal. The first intermediate beam is dispersed in time relative to the filter input signal and the second intermediate beam is dispersed in time relative to the input signal, however, the filter output signal has less time dispersion relative to the filter input signal than the first intermediate beam has relative to the filter input signal. The dispersive elements are preferably part of one or more optical gratings. The second intermediate beam is an inverted image of the first intermediate beam. The inverted image is chosen such that any time dispersion introduced by the reflection of the second intermediate beam with the second dispersive element compensates for time dispersion introduced in the first intermediate beam by the reflection of the portion of the filter input signal by the first dispersive element. Embodiments of the first optical assembly can be constructed from first and second imaging elements, each imaging element collimating light from a light source placed at a focal point associated with that imaging element. The focal point of the second imaging element is coincident with the focal point of the first imaging element. An aperture place can be included in the first optical assembly, an aperture located proximate to the focal point of the first optical element.

In another embodiment of the invention, the optical filter of claim aa1 further includes a polarization-dependent beam splitter and a half-wave plate, the polarization-dependent beam splitter having an input port for receiving the filter input signal and first and second output ports. The polarization-dependent beam splitter generates a first input light signal and a second input light signal from the filter input signal. The first input light signal is linearly polarized in a first polarization direction, and the second input light signal is linearly polarized in a second polarization direction that is orthogonal to the first polarization direction. The first input light signal leaving the first output port and the second input light signal leaving a second output port, the first and second output ports being spatially separated. The first input light signal traversing the optical signal path traversed by the second input light signal, but in the reverse direction. The half-wave plate rotates the polarization of the first input light signal by 90 degrees prior to the first input light signal being diffracted by the grating. The portion of the diffracted second intermediate beam that forms a portion of the filter output signal enters the second output port of the polarization-dependent beam splitter. A portion of the second input optical signal traverses the filter via the optical signal path, but in the opposite direction, to form a second output light signal that enters the first output port of the polarization-dependent beam splitter and is combined with the first output light signal to form the filter output signal. In the preferred embodiment of the present invention, the first optical assembly includes a reflector assembly for causing light traversing the optical signal path to be diffracted additional times from the grating such that the first and second intermediate beams have cross-sections that are substantially circular. The reflector assembly is preferably movable such that the position of the reflector assembly determines the filter center wavelength.

BRIEF DESCRIPTION OF THE DRAWINGS

FIGS. 2A–B illustrate the basic mechanism utilized by the present invention to eliminate the time dispersion.

DETAILED DESCRIPTION OF THE INVENTION

Figure 1:
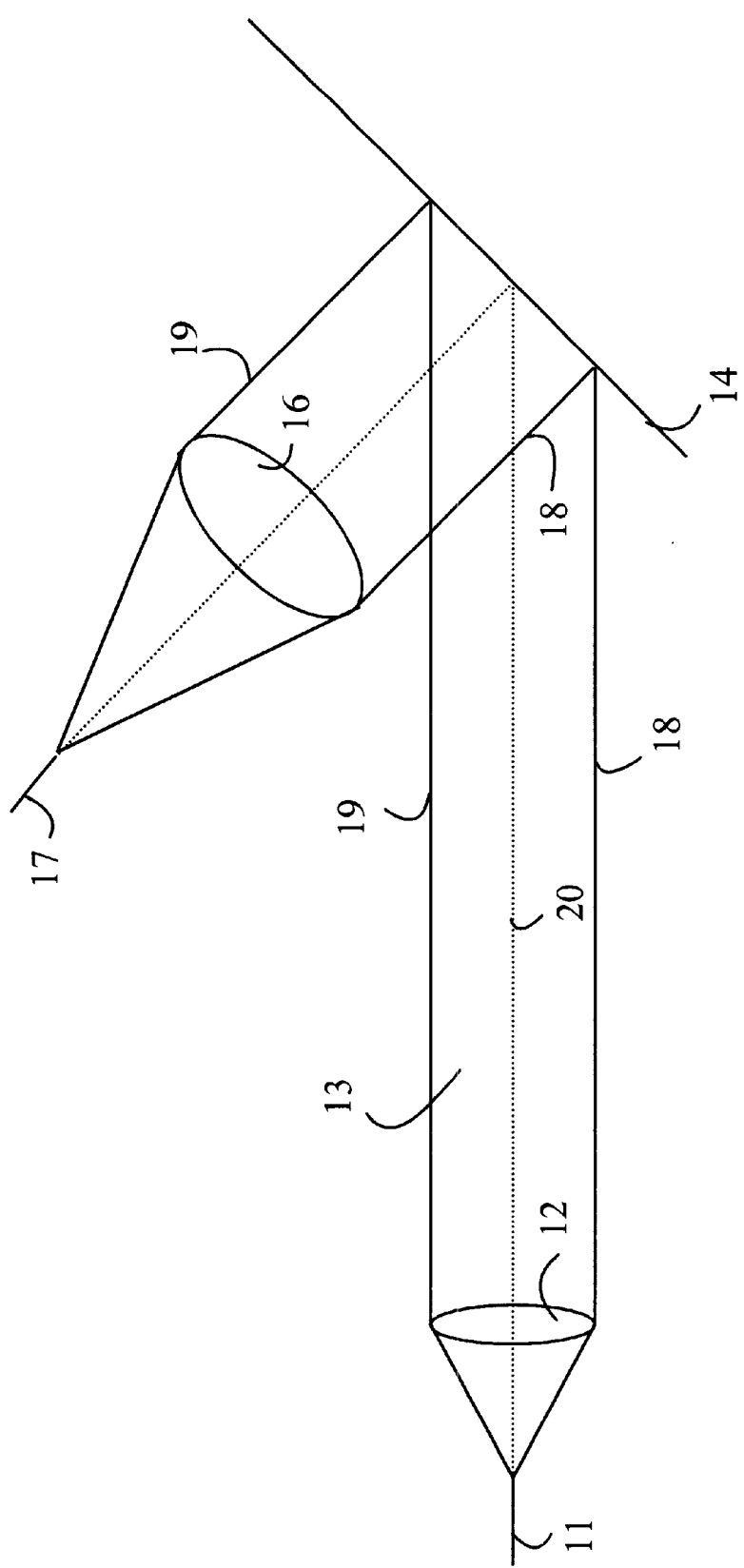
FIG. 1 is a block diagram of a filter that utilizes a grating.

The manner in which the present invention provides its advantages may be more easily understood with reference to FIG. 1, which is a block diagram of a filter that utilizes a grating. Light having a range of wavelengths from an inbound fiber 11 is collimated by lens 12 to form a collimated beam 13 that is directed to grating 14. Grating 14 disperses the light based on the wavelength of the incident light. The light that is traveling in the direction corresponding to the wavelength in question is focused by lens 16 into outbound fiber 17. It is clear from an examination of FIG. 1 that the light from different portions of the collimated beam traverses paths having different lengths in reaching lens 16. In particular, the light below the centerline 20 along edge 18 traverses the shortest distance, while the light on the opposite edge shown at 19 traverses the longest distance. This difference in path length introduces time dispersion into the filtered light as discussed above.

Refer now to FIGS. 2A–B, which illustrate the basic mechanism utilized by the present invention to eliminate the time dispersion discussed above. FIG. 2A is a side view of analyzer 30 and FIG. 2B is a top view of analyzer 30. Analyzer 30 collimates light incident on fiber 31 with lens 32 to form an input collimated beam 33 that is directed toward grating 34. Light leaving the grating at the desired direction strikes retroreflector 35, which redirects the light back toward grating 34. An imaging assembly 36 forms a new beam 44 that is completely flipped about its center optical axis. For the purposes of this discussion, two planes will be defined with respect to a light beam that is incident on the grating. The first plane includes the centerline of the beam and intersects the grating with the line of intersection being parallel to the grooves of the grating. This plane will be referred to as the "non-dispersion plane" in the following discussion. The second plane, the "dispersion plane", is orthogonal to the non-dispersion plane, the line of intersection of the non-dispersion plane and the dispersion plane being along the center of the beam. With reference to these planes, the retroreflector flips the beam about the dispersion plane. Then, imaging assembly 36 flips the beam about both planes such that the net effect is that beam 44 is flipped about the non-dispersion plane. The inverted image beam 44 is then diffracted from grating 34 at the same angle as the original incident angle of beam 33 relative to the grating 34. Technically, the second pass diffracted by the grating is not dispersed but rather is condensed in the configuration depicted in FIGS. 2A–B in the sense that whatever wavelengths of light that passed through the aperture plate 38 will be focused onto fiber 42. This condensation results from the flipping of beam 43 about the non-dispersion plane. Time dispersion is corrected very exactly in the embodiment shown in FIGS. 2A–B. The rays that were retarded relative to the centerline of the beam by the first diffraction are advanced by the second diffraction and vice versa. As a result, the time dispersion introduced by the first diffraction is reversed by the second diffraction. The output light in beam 40 is then focused into output fiber 42 by lens 41

Imaging assembly 36 is constructed from lenses 37 and 39. An aperture plate 38 defines the width of the filter function provided by the analyzer. The aperture plate is preferably a piece of thin opaque material having a hole that is typically rectangular. At the aperture plate, the beam cross-section has a non-dispersion direction and a dispersion direction. The long axis of the rectangular opening is in the non-dispersion direction and the short axis is in the dispersion direction. The hole in the aperture plate can also have other shapes, however a rectangular shape offers alignment advantages. Here, the dispersion direction is defined as orthogonal to the beam optical axis and parallel to the dispersion plane. The non-dispersion direction is defined as orthogonal to the beam optical axis and orthogonal to the dispersion direction.

While the arrangement shown in FIGS. 2A–B eliminates the time dispersion introduced by the grating, the polarization state of the output light is altered. In general, gratings have different diffraction efficiencies for light of different polarizations. Light that has a polarization perpendicular to the ridges of the grating is diffracted from the grating with a different efficiency than light that has a polarization vector that is parallel to the ridges of the grating. As a result, the polarization vector of the output light in the arrangement shown in FIGS. 2A–B will be rotated relative to the direction of the polarization vector in the incident light. In addition, the intensity of the output light is generally less than optimal, since one component of the polarization vector is diffracted with less efficiency than the component in the other direction.

Figure 3:
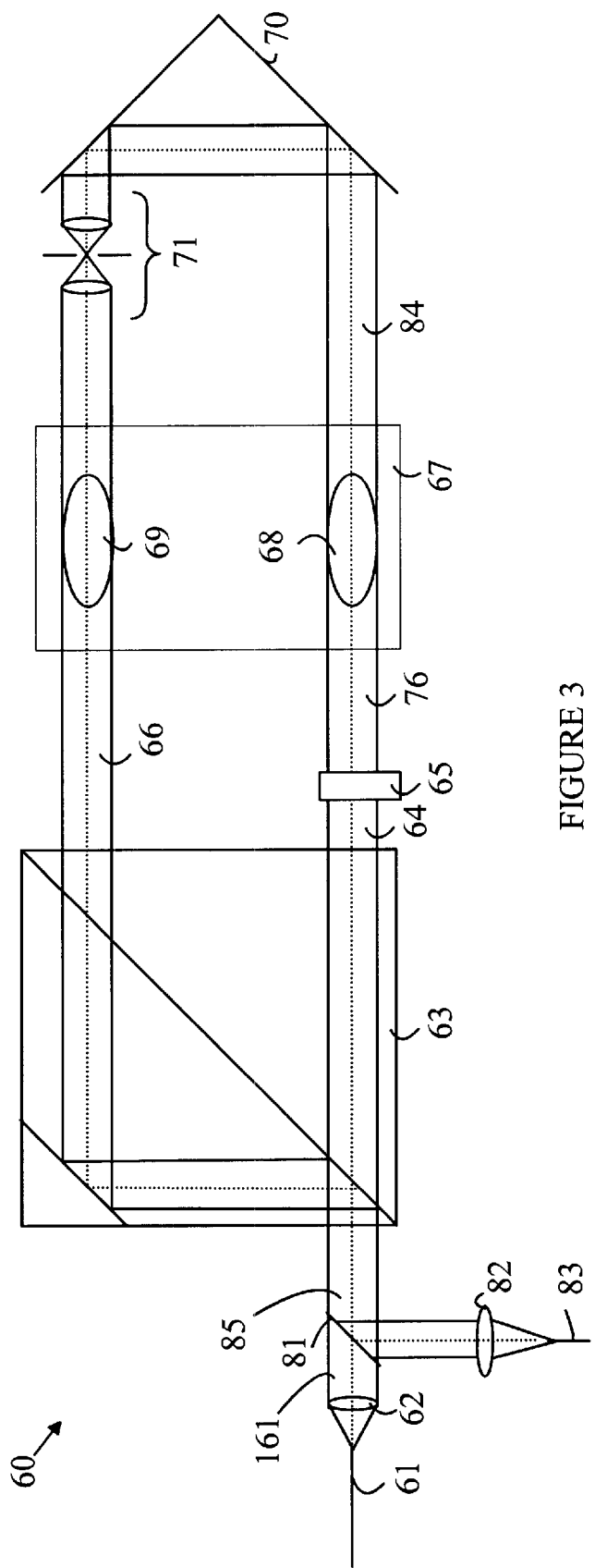
FIG. 3 illustrates another embodiment of an analyzer according to the present invention.

An embodiment of the present invention that cures this defect is shown in FIG. 3, which is a side view from the same perspective as FIG. 2A of another embodiment of an analyzer according to the present invention. Analyzer 60 receives light from an input optical fiber 61. The output of fiber 61 is collimated by lens 62 to form beam 161, which is then split into two collimated beams, which are shown at 64 and 66, by polarization-dependent beam splitter 63. The polarization direction of beam 64 is rotated through 90 degrees by half waveplate 65 such that beams 66 and 76 have the same direction of linear polarization, the polarization direction being chosen to maximize the efficiency of grating 67. In the preferred embodiment, waveplate 65 is positioned in beam 64; embodiments in which waveplate 65 is positioned in beam 66 can also be constructed. Beam 76 is processed in essentially the same manner as beam 33 discussed above. Beam 76 is diffracted by grating 67 at 68, and light traveling in the desired direction is captured by retroreflector 70 and directed back to grating 67 via an inverted imaging assembly 71 and is diffracted at 69 back to polarization beam splitter 63. This light is then directed by polarization beam splitter 63 into beam 85. A portion of the light in beam 85 is reflected into lens 82 by reflector 81. Lens 82 images the light into output fiber 83.

The light in beam 66 traverses the same optical path as that from light 76 in reverse. That is, the light from beam 66 is diffracted from grating 67 at 69, passes through inverted imaging assembly 71 and is again diffracted from grating 67, this time at 68. The diffracted light passes through half-waveplate 65, which rotates the polarization vector such that beam 64 will pass through beam splitter 63 and be reflected from reflector 81. Lens 82 images the light into output fiber 83.

While the analyzer shown in FIG. 3 solves the polarization dependent problems, it is still less than ideal. In particular, the cross-section of beam 84 will, in general, be elliptical even if the cross-section of beam 76 is circular. This elliptical shape is more difficult to process by the temporal dispersion corrector 71. For example the lenses required must be larger in size than the input collimating lens.

Figure 4:
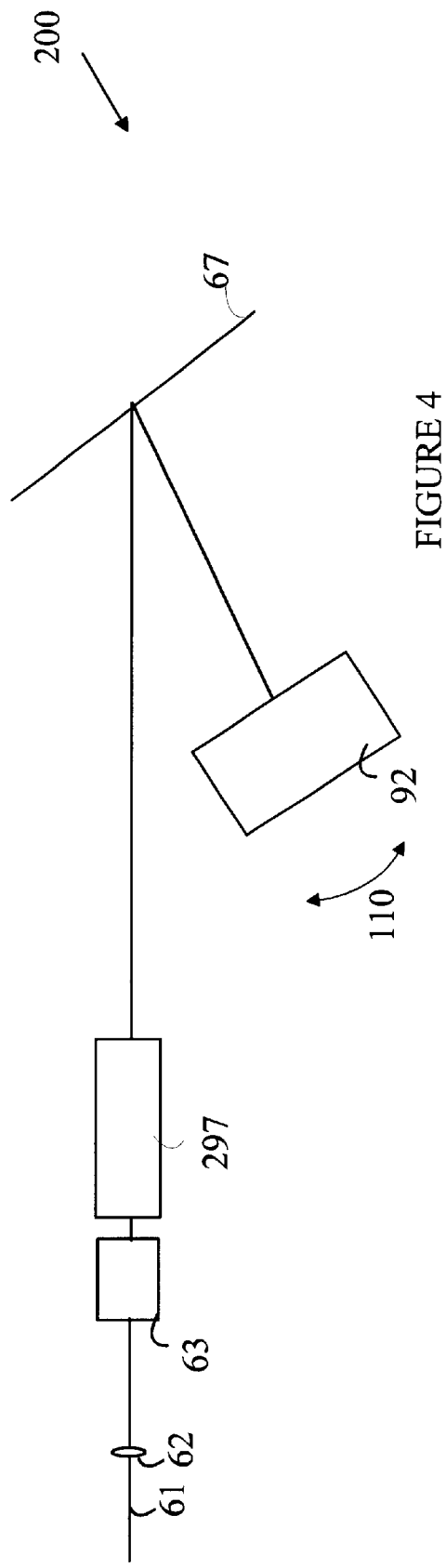
FIG. 4 is a simplified top view of an analyzer 200 according to the present invention.
Figure 5:
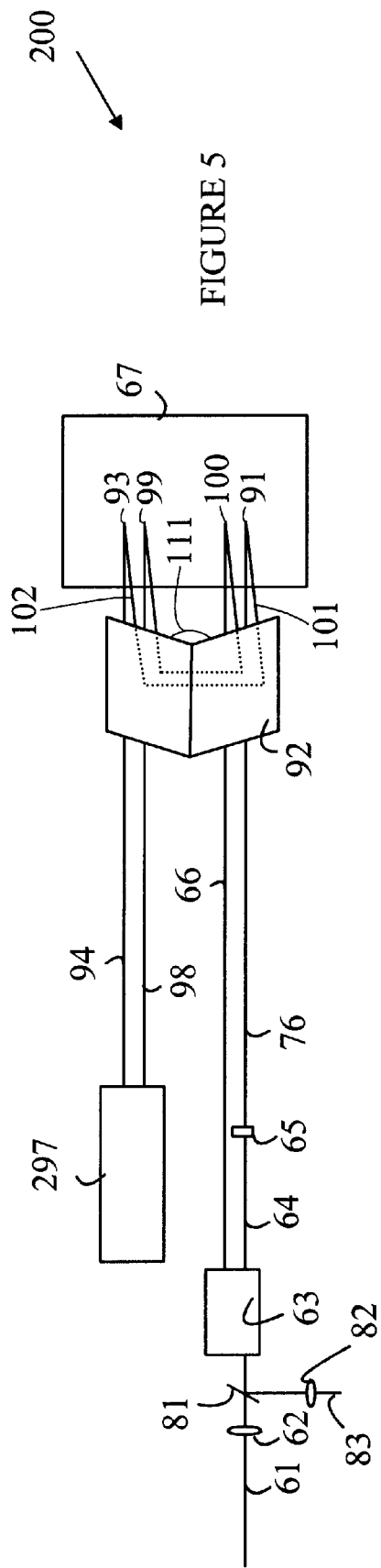
FIG. 5 is a simplified side view of analyzer 200.

Refer now to FIGS. 4 and 5, which are simplified top and side views, respectively, of an analyzer 200 according to another embodiment of the present invention. To simplify the following discussion, the components in analyzer 200 that perform the same function as components shown in FIG. 3 have been given the same numeric designations and will not be discussed further here. In addition, the collimated beams are shown as single lines positioned at the centerlines of the beams.

The manner in which analyzer 200 provides its advantages may be more easily understood by following the processing of beam 76. Beam 76 is circular in cross-section. Beam 76 is diffracted from grating 67 at 91, and the light leaving the grating at the desired angle is redirected back to the grating at 93 by retroreflector 92. Beams 101 and 102 are elliptical in cross-section. Light leaving the grating at 93 is redirected back toward the grating by a retroreflector and inverted imaging assembly 297 to form beam 98, which is flipped about the non-dispersion plane relative to beam 94. Assembly 297 is similar to retroreflector 70 and inverted imaging assembly 71 shown in FIG. 3. It should be noted that beams 94 and 98 are circular in cross-section, and hence, the problems associated with processing an elliptical beam are avoided. The light in beam 98 strikes grating 67 at 99. Light leaving the grating at the desired angle from 99 is redirected back to grating 67 by retroreflector 92 and strikes grating 67 at 100. The portion of this light that leaves at the desired angle, i.e., beam 66, is directed to the output fiber 83 via beam splitter 63 and mirror 81. It should be noted that this light moves on the same path as beam 66 created by beam splitter 63 from the orthogonal polarization state of the input signal.

The light from input fiber 61 that is diverted to beam 66 by beam splitter 63 is processed in a similar manner. This light returns on the path of beam 64 with the proper polarization to reach reflector 81.

It should be noted that the arrangement shown in FIGS. 4 and 5 provides additional advantages. In addition to overcoming the problems associated with elliptical beams, the additional diffractions from grating 67 improve the specificity of the wavelength selection. Furthermore, the position of retroreflector 92 with respect to grating 67 determines the angle at which light dispersed by the grating is collected. Hence, by moving retroreflector 92 on an arc as shown by the arrow at 110, the output wavelengths of the analyzer can be altered.

The embodiment shown in FIGS. 4 and 5 generates an output signal that is coincident with the input signal, and hence, some form of optical system such as reflector 81 must be utilized to separate the two signals. Any such optical system reduces the light intensity in the output signal. For example, the arrangement shown in FIG. 4 reduces the output intensity by a factor of 4 because of the losses at reflector 81. Accordingly, it would be advantageous to provide a system in which the output and input signals are displaced from one another, and hence, beam splitter 81 could be eliminated.

This can be accomplished by altering the angle of retroreflector 92. Normally, a retroreflector is constructed from two planar mirrors at right angles to one another, i.e., angle 111 shown in FIG. 5 is 90°. If this angle is increased to 90°+α, the output beam will travel at an angle of 4α with respect to the input beam when it exits beam splitter 63, and hence lens 62 will focus the output beam at a location that is displaced from that of the input fiber. In such an embodiment, beam splitter 81 can be eliminated and the output fiber 83 can be placed next to input fiber 61.

The output beam can also be separated from the input beam by altering the position of beam splitter 63 relative to the apex of retroreflector 92. If the position of beam splitter 63 is moved vertically relative to the apex of reflector 92, the input and output beams traverse paths that are separated from one another, and the output beam will be separated from the input beam at beam splitter 63.

Figure 6:
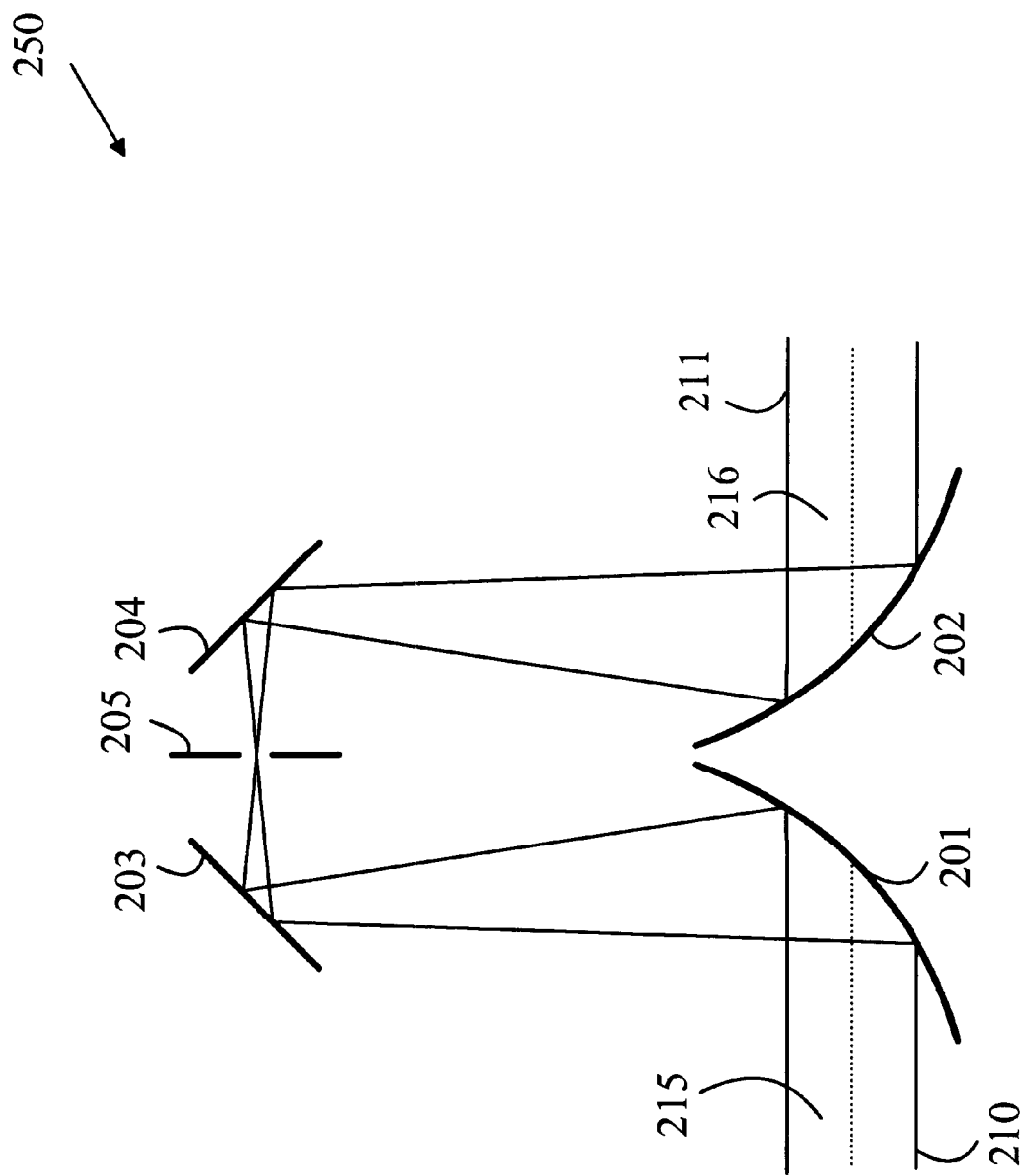
FIG. 6 is a cross-sectional view of another embodiment of an inverted imaging assembly that can be utilized with the present invention.

The above-described embodiments of the present invention utilize an inverted imaging assembly consisting of two lenses and an aperture plate. However, other optical arrangements may be utilized. Refer now to FIG. 6, which is a cross-sectional view of another embodiment of an inverted imaging assembly that can be utilized with the present invention. The view shown in FIG. 6 corresponds to an orientation in which the dispersion plane is in the plane of the paper. Inverted imaging assembly 250 is constructed from two focusing mirrors shown at 201 and 202, which perform the functions of the lenses shown in the previous embodiments. These mirrors can be parabolic mirrors that focus each plane, or they can be cylindrical mirrors that focus only one plane. A collimated beam 215 entering assembly 250 is processed into an output beam 216, which is flipped completely about its optical axis. Hence, a ray at the bottom of the beam such as ray 210 is reflected to a position on the top of the beam as shown at 211. Assembly 250 utilizes two planar mirrors shown at 203 and 204 to redirect the beam such that the output beam is a "continuation" of the input beam. An aperture that defines the acceptance angle of the assembly may be included in the assembly. Such an aperture is shown at 205.

Figure 7:
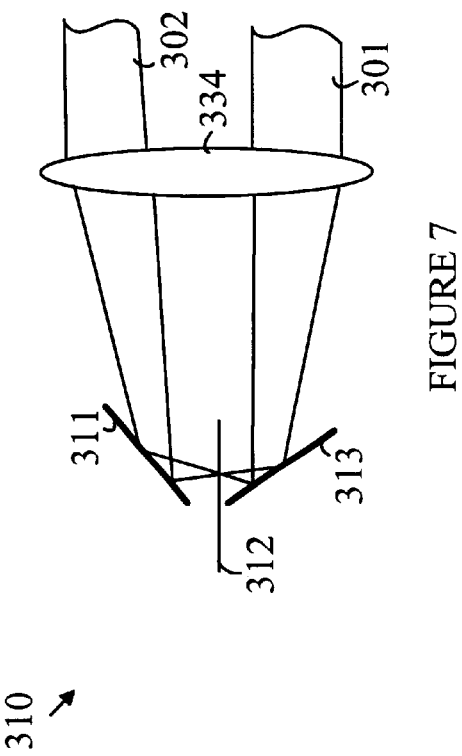
Figure 9:
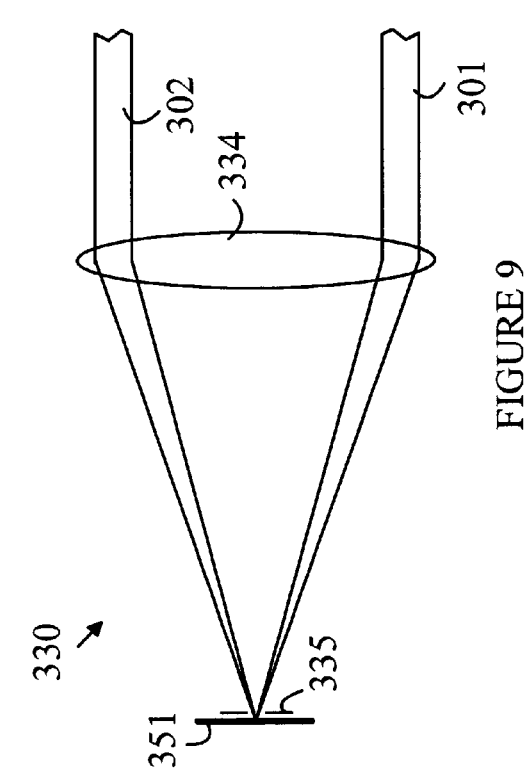

Further examples of inverted imaging assemblies that can be used for assembly 297 are shown in FIGS. 7–10, which are cross-sectional views of 4 inverted image assemblies according to the present invention. To simplify the following discussion, those elements that perform the same function in each figure have been given like numeric designations. All of the cross-sectional views are shown in an orientation in which the non-dispersion plane is in the plane of the paper. Refer now to FIG. 7, which is a cross-sectional view of an inverted imaging assembly 310 according to the present invention. Assembly 310 converts an input beam 301 to an output beam 302 traveling in the opposite direction. The output beam is the input beam flipped about its optic axis so as to compensate for time dispersion as discussed above. Assembly 310 utilizes two planar mirrors shown at 311 and 313 and a single lens 334. An aperture plate is placed in the plane shown at 312 such that the long axis of the aperture plate is parallel to the line shown at 312. The embodiment shown in FIG. 7 requires that beams 301 and 302 not be parallel.

Figure 8:
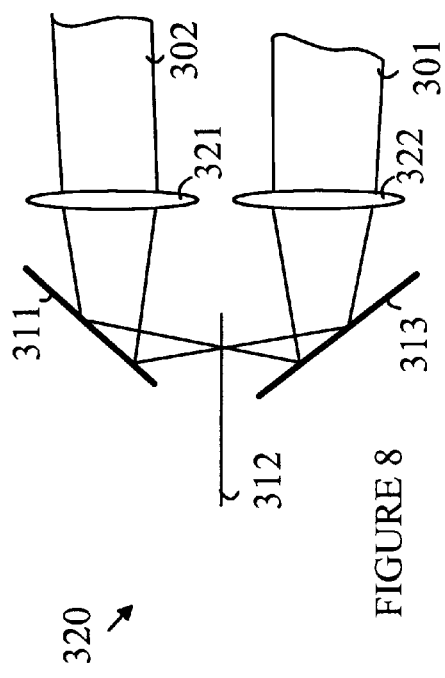
FIGS. 7–10 are cross-sectional views of additional embodiments of inverted imaging assemblies according to the present invention.

Referring to FIG. 8, which is a cross-sectional view of an image assembly 320, the lens 334 can be replaced by the two smaller lenses shown at 321 and 322. This embodiment functions properly for input and output beams that traverse paths that are parallel as well as non-parallel.

Figure 10:
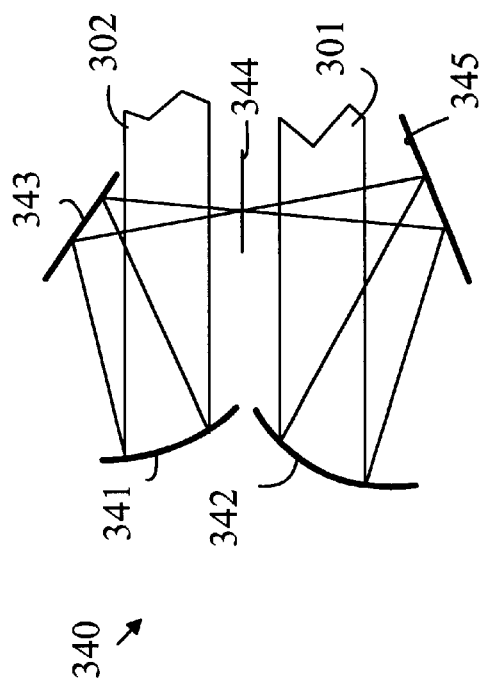

In the embodiments shown in FIGS. 7, 8, and 10, the output beam will be anti-parallel to the input beam if the beams are aligned parallel to the optic axis of the lenses. However, if the beam directions are skewed with respect to the optic axis of the lens, the input and output beams will be skewed with respect to one another. This lack of alignment tolerance is cured by the embodiment shown in FIG. 9, which is a cross-sectional view of an imaging assembly 330 having a planar mirror 351 and aperture plate 335. It can be shown that the input beam and output beam will be anti-parallel if an odd number of mirrors is utilized even if the input and output beams are skewed with respect to the optic axis of lens 334.

An embodiment of an imaging assembly according to the present invention that provides beams traversing parallel paths while using only mirrors is shown in FIG. 10, which is a cross-sectional view of another embodiment of an inverted imaging assembly according to the present invention. Assembly 340 is constructed from two parabolic mirrors shown at 341 and 342. These mirrors provide collimating functions analogous to that of the lenses shown in FIG. 8. Planar mirrors 343 and 345 provide the beam redirection function in this embodiment. An aperture plate 344 is placed between mirrors 343 and 345 in a manner analogous to that described above with respect to the aperture plates shown in FIGS. 7–9.

From the above example, it will be apparent that a suitable inverted imaging assembly can be constructed from two imaging elements that process the collimated beam in a serial fashion. The focal point of the first imaging element is placed at the focal point of the second imaging element such that a collimated input beam is converted to a collimated output beam that is flipped about the non-dispersion plane relative to that of the collimated input beam. If an acceptance angle-defining aperture is needed, the aperture is placed at or near the focal point of the first imaging element.

The above-described embodiments utilize a particular embodiment of a polarization-dependent beam splitter. However, this function may be implemented in other ways. The temporal dispersion correction is not dependent on the manner in which the polarizations are separated. For example, a polarization-dependent beam splitter can be implemented utilizing a "walk-off" crystal. As described previously, temporal dispersion is corrected in embodiments that do not split the polarizations of the input beam.

Figure 11:
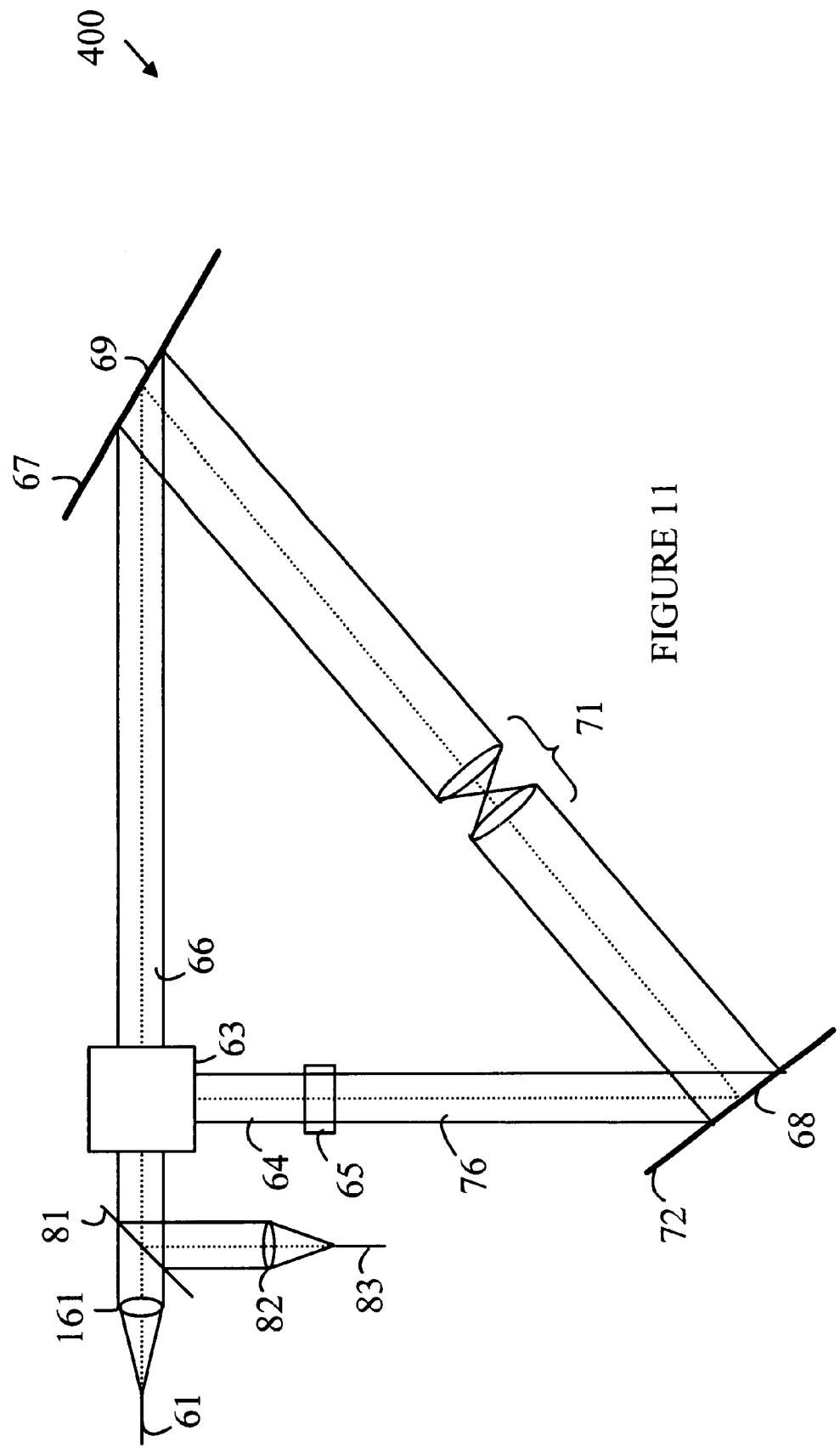
FIG. 11 is a top view of an analyzer 400 according to the present invention that employs two gratings.

The above-described embodiments of the present invention have utilized a single grating from which the beam is dispersed twice. It should be noted that the embodiments of the present invention that utilize a single grating can be viewed as having two gratings that are part of a larger grating. However, embodiments of the present invention in which two separate gratings are utilized may also be practiced. Refer now to FIG. 11, which is a top view of an analyzer 400 according to the present invention, that employs two gratings. Analyzer 400 is similar to analyzer 60 shown in FIG. 3. To simplify the discussion, those elements of analyzer 400 that have corresponding counterparts in analyzer 60 have been given the same numeric designations. The input light beam 61 is split into two beams by a polarization dependent beam splitter 63. These beams are shown at 64 and 66. Beam 66 is dispersed by grating 67. The dispersed light in the desired direction is processed by inverted image assembly 71 to generate a flipped beam that is dispersed by grating 72. The light leaving grating 72 in the desired direction has its polarization vector rotated through 90 degrees by half wave plate 65 and re-enters beam splitter 63. The polarization of the light from beam 64 is rotated through 90 degrees by half wave plate 65 to form beam 76. This beam traverses the same path as beam 66, but in the opposite direction. The light from beam 76 is dispersed twice and re-enters beam splitter 63 where it is recombined with the light from beam 66 to form an output beam that is partially reflected by mirror 81 directed to output fiber 83. The center wavelength that is selected by analyzer 400 can be varied by rotating one or both of the gratings.

The above-described embodiments of the present invention have utilized gratings to disperse the light. However, embodiments that utilize other dispersive elements such as prisms can also be practiced.

The above-described embodiments of the present invention often refer to two light beams travelling in the same direction. It is to be understood that these light beams do not need to travel along precisely parallel paths. Two beams will be deemed to travel in the same direction if the deviation in the paths from absolutely parallel paths is insufficient to cause the output light signal to miss the collimating optics such as lens 82 shown in FIG. 3.

Various modifications to the present invention will become apparent to those skilled in the art from the foregoing description and accompanying drawings. Accordingly, the present invention is to be limited solely by the scope of the following claims.

What is claimed is:

1. An optical filter for generating a filter output signal from a filter input signal, said filter output signal consisting of light from said filter input signal in a predetermined bandwidth at a center wavelength, said filter comprising:
    a first dispersive element;
    a second dispersive element;
    a first optical assembly; and
    a first signal path over which a portion of said filter input signal traverses and is diffracted from said first dispersive element to form a first intermediate beam that is input to said first optical assembly which generates a second intermediate beam therefrom, said second intermediate beam being directed to said second dispersive element and being diffracted by said second dispersive element, a portion of said diffracted second intermediate beam forming a portion of said filter output signal, wherein said first intermediate beam is dispersed in time relative to said filter input signal and said second intermediate beam is dispersed in time relative to said input signal, however, said filter output signal has less time dispersion relative to said filter input signal than said first intermediate beam has relative to said filter input signal.

2. The optical filter of claim 1 wherein said first and second dispersive elements comprise optical gratings.

3. The optical filter of claim 2 wherein said first and second dispersive elements are part of a single grating.

4. The optical filter of claim 1 wherein said second intermediate beam is an inverted image of said first intermediate beam, said inverted image being chosen such that any time dispersion introduced by the reflection of said second intermediate beam with said second dispersive element compensates for time dispersion introduced in said first intermediate beam by said reflection of said portion of said filter input signal by said first dispersive element.

5. The optical filter of claim 4 wherein said first optical assembly comprises first and second imaging elements, each imaging element collimating light from a light source placed at a focal point associated with that imaging element, said focal point of said second imaging element being coincident with said focal point of said first imaging element.

6. The optical filter of claim 5 further comprising a light blocking element having an aperture located proximate to said focal point of said first optical element, said light blocking element blocking light striking said light blocking element outside of said aperture.

7. The optical filter of claim 5 wherein each imaging element comprises a lens.

8. The optical filter of claim 5 wherein each imaging element comprises a non-planar mirror.

9. The optical filter of claim 4 wherein said first optical assembly further comprises a retroreflector for redirecting light from said first intermediate beam toward said second dispersive element in a direction that is substantially parallel, but opposite to that of said first intermediate beam.

10. The optical filter of claim 1 further comprising a polarization-dependent beam splitter and a half-wave plate, said polarization-dependent beam splitter having an input port for receiving said filter input signal and first and second output ports, said polarization-dependent beam splitter generating a first input light signal and a second input light signal from said filter input signal, said first input light signal being linearly polarized in a first polarization direction and said second input light signal being linearly polarized in a second polarization direction that is orthogonal to said first polarization direction, said first input light signal leaving said first output port and said second input light signal leaving said second output port, said first and second output ports being spatially separated, said first input light signal traversing said first signal path, and said half-wave plate for rotating the polarization of said first input light signal by 90 degrees prior to said first input light signal being diffracted by said dispersive element.

11. The optical filter of claim 10 wherein said portion of said reflected second intermediate beam that forms a portion of said filter output signal enters said second output port of said polarization-dependent beam splitter.

12. The optical filter of claim 11 wherein a portion of said second input optical signal traverses said filter via said first signal path, but in the opposite direction, to form a second output light signal that enters said first output port of said polarization-dependent beam splitter and is combined with said first output light signal to form said filter output signal.

13. The optical filter of claim 1 wherein said first optical assembly comprises a reflector assembly for causing light traversing said first signal path to be diffracted additional times such that said first and second intermediate beams have cross-sections that are substantially circular.

14. The optical filter of claim 13 wherein said reflector assembly is movable, the position of said reflector assembly determining said center wavelength.

15. The optical filter of claim 13 wherein said reflector assembly causes said filter output signal to be spatially displaced relative to said filter input signal.

* * * * *